US011592370B2

(12) United States Patent
Kozikowski, III et al.

(10) Patent No.: US 11,592,370 B2
(45) Date of Patent: Feb. 28, 2023

(54) FLUID COVERAGE SENSING SYSTEM AND METHOD

(71) Applicant: Ventana Medical Systems, Inc., Tucson, AZ (US)

(72) Inventors: Raymond Kozikowski, III, Tucson, AZ (US); Marian Mikaela Rygelski, San Francisco, CA (US); Matthew Thurman, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 17/503,294

(22) Filed: Oct. 16, 2021

(65) Prior Publication Data
US 2022/0034767 A1 Feb. 3, 2022

Related U.S. Application Data

(60) Division of application No. 15/987,799, filed on May 23, 2018, now Pat. No. 11,181,450, which is a
(Continued)

(51) Int. Cl.
*G01N 1/31* (2006.01)
*G01N 27/02* (2006.01)
(Continued)

(52) U.S. Cl.
CPC ............ *G01N 1/312* (2013.01); *G01N 27/02* (2013.01); *G01V 3/06* (2013.01); *G01N 35/1002* (2013.01);
(Continued)

(58) Field of Classification Search
CPC ...... G01N 27/00; G01N 27/002; G01N 27/02; G01N 27/028; G01N 1/312; G01N 27/26; G01B 3/06
See application file for complete search history.

(56) References Cited

U.S. PATENT DOCUMENTS 4,433,577 A 2/1984 Khurgin et al.
5,073,867 A * 12/1991 Murphy .................. G06N 3/04
706/42
(Continued)

FOREIGN PATENT DOCUMENTS

EP 2404675 B1 6/2015
FR 2867268 A1 9/2005
(Continued)

*Primary Examiner* — Christopher E Mahoney
(74) *Attorney, Agent, or Firm* — Charney IP Law LLC; Thomas M. Finetti (57) ABSTRACT

A system for applying a fluid to a substrate bearing a sample for analysis has an array of sensor plates positioned to sense the presence of fluid in contact with respective areas of the substrate. In a particular embodiment, fluid presence in different areas of the substrate is sensed by the effect of the fluid and its identity on the impedances of capacitors formed between sensor plates within the array. In a more particular embodiment, by polling the sensor array continually while fluid is applied to the substrate determine a coverage map, a fluid dispensing mechanism can be controlled to efficiently cover the entire substrate with fluid a minimal amount of fluid, thereby reducing waste.

13 Claims, 8 Drawing Sheets

Related U.S. Application Data continuation of application No. PCT/EP2016/079547, filed on Dec. 2, 2016.

(60) Provisional application No. 62/262,855, filed on Dec. 3, 2015.

(51) Int. Cl.
*G01V 3/06* (2006.01)
*G01N 35/10* (2006.01)

(52) U.S. Cl.
CPC . *G01N 35/1016* (2013.01); *G01N 2035/1025* (2013.01)

(56) References Cited

U.S. PATENT DOCUMENTS

| | | | |
|---|---|---|---|
| 5,081,421 A | 1/1992 | Miller et al. | |
| 6,278,281 B1* | 8/2001 | Bauer | G01N 27/221 |
| | | | 324/668 |
| 7,017,394 B2 | 3/2006 | Sullivan | |
| 8,145,434 B2* | 3/2012 | Shachar | G01N 33/54373 |
| | | | 702/19 |
| 8,547,111 B2 | 10/2013 | Hadwen et al. | |
| 2004/0036485 A1 | 2/2004 | Sullivan | |
| 2010/0229642 A1 | 9/2010 | Berndt et al. | |
| 2012/0241045 A1 | 9/2012 | Aouad | |
| 2014/0305194 A1* | 10/2014 | Surman | G01F 23/26 |
| | | | 73/61.44 |
| 2015/0005196 A1* | 1/2015 | Berndt | C12M 41/36 |
| | | | 435/287.1 |
| 2016/0003763 A1 | 1/2016 | Johnson et al. | |
| 2018/0356434 A1 | 12/2018 | Gumbrecht et al. | |

FOREIGN PATENT DOCUMENTS

| | | |
|---|---|---|
| JP | 2005534938 A | 11/2005 |
| WO | 83/00931 A1 | 3/1983 |
| WO | 2003020418 A1 | 3/2003 |
| WO | 2004017050 A1 | 2/2004 |
| WO | 2014165327 A1 | 10/2014 |
| WO | 2015121206 A1 | 8/2015 |

\* cited by examiner

FLUID COVERAGE SENSING SYSTEM AND METHOD

RELATED APPLICATION DATA

This is a continuation of U.S. patent Ser. No. 15/987,799 filed on May 23, 2018, which application is a divisional of International Patent Application No. PCT/EP2016/079547 filed Dec. 2, 2016, which claims priority to and the benefit of U.S. Provisional Application No. 62/262,855, filed Dec. 3, 2015. Each of these prior patent applications is incorporated by reference herein.

FIELD

This disclosure relates to the general field of systems in which a liquid is applied to treat a sample for study or analysis, and more particularly to systems and methods in which a sample is placed on a slide and then covered with a liquid that aids in its analysis.

BACKGROUND

In a number of systems used in medical diagnostics and other biological technologies that are used to test or study a biological sample (for example, a thin sample of tissue or smear of cells), the sample is placed on a glass slide or other substrate, and a fluid is applied over it. The fluid typically contains one or more chemicals that interact with the sample, for example, staining the tissue sample or binding to specific analytes in the sample. The treated sample is then reviewed by human observation or possibly using automated sensors to determine whether the sample exhibits one or more properties after interaction with the fluid.

For proper analysis of the sample, it is normally necessary for the fluid to be applied to cover at least a sufficient portion of the sample or the entire sample or possibly the entire surface of the slide. Covering the sample or the slide may be difficult to do reliably due to the variability of the surface forces at the fluid-glass boundary, and possibly due to errors in automated dispensing of fluids to the sample. As a result, the sample or slide may only be partly covered by the fluid, or a bubble may be formed separating the sample from the fluid, either of which may result in an inaccurate analysis of the sample.

Most commonly, the application of the fluid is performed by an apparatus that automatically applies the fluid to the slide inside an instrument. This makes inspection or monitoring by a human technician of the puddle coverage and the lack of bubbles difficult, and such constant monitoring by a person defeats the purpose of automation.

In the absence of human visual inspection, a number of approaches to ensure the full sample or slide coverage have been employed. Those approaches include flooding the slide with the fluid, dispensing a large puddle of the analysis fluid, or repeatedly supplying fluid to the slide. However, all such approaches are wasteful of the fluid used in the analysis, with the result that processing of the tissue is more expensive.

SUMMARY

A system is disclosed for detecting fluid coverage of a substrate, that includes a substrate holder for holding the substrate, an array of capacitive plates in proximity to the substrate holder, a fluid supply configured to deliver a fluid to the substrate held on the substrate holder, and sensing electronics in electrical connection to the array of capacitive plates, wherein the sensing electronics periodically connect two poles of a current to at least one pair of plates and detects an output signal indicative of an electric property between the at least one pair of plates. In particular embodiments, the disclosed system automatically detects and confirms sufficient coverage of a sample or the substrate in an analysis or treatment with the fluid. In other particular embodiments, the disclosed system provides a quantitative assessment of the coverage of the fluid puddle on the slide inside the instrument used, either by an automated coverage verification system or using an integrated sensor array connected with an embedded feedback loop that controls the dispensing and/or mixing of the fluid onto the substrate during fluid application to the substrate, such as for staining of a biological sample held on the substrate. In still other particular embodiments, the disclosed system provides active, non-invasive, real-time detection of the volume of fluid that has been dispensed onto the slide, which, for example, could be used as a troubleshooting system in development or technical support service of the system. In even other particular embodiments, the disclosed system can provide identification and/or verification of the type of fluid (such as a dye solution like eosin, a buffer solution, a non-polar solvent) that is dispensed to the substrate.

Also disclosed is a method including providing a sample support having a sample thereon to be treated with a reagent fluid, applying the reagent fluid to the sample support, and, sensing the presence of the reagent fluid on the sample support, wherein sensing includes detecting a respective impedance for at least one pair of a plurality of sensor elements positioned in proximity to the sample support such that presence of the reagent fluid in a respective subarea of the sample support alters the impedance of a capacitor formed between the at least one pair of the plurality of the sensor elements. In particular embodiments, the sample is a biological sample, for example a tissue section. In other particular embodiments, a degree of fluid coverage is determined from said sensing. In further embodiments, applying the reagent fluid includes applying the reagent fluid from a fluid supply mechanism that is in feedback control with the sensing step such that the reagent fluid is dispensed, mixed or otherwise dispersed to achieve a predetermined degree of fluid coverage on the sample support.

BRIEF DESCRIPTION OF THE DRAWINGS

Further features and advantages of disclosed system and method will become apparent in view of the Detailed Description that follows, and through reference to the accompanying figures in which.

DETAILED DESCRIPTION

Disclosed is a system for detecting fluid coverage of a substrate that includes a substrate holder for holding the substrate, an array of capacitive plates in proximity to the substrate holder, a fluid supply configured to deliver a fluid to the substrate held on the substrate holder, and sensing electronics in electrical connection with the array of capacitive plates. According to one embodiment, the sensing electronics periodically connect two poles of a current to at least one pair of plates and detects an output signal indicative of an electric property between the at least one pair of plates. The array of capacitive plates can be one or more of integrated into the substrate holder, integrated into the substrate and held in a position on a side of the substrate opposite the substrate holder. For example, in particular embodiments, the substrate is a microscope slide and the array of capacitive plates is contained in a structure supporting the slide, is contained in the slide itself, or is supported above the slide so as to directly sense the fluid on the slide, such as a puddle of fluid on the slide.

In particular embodiments, the sensing electronics are configured to determine a baseline output signal indicative of a substrate having no fluid coverage thereon. In other particular embodiments, the sensing electronics are configured to develop a coverage map of the fluid on the substrate, such as it is dispensed, mixed, moved or removed on or from the substrate by detecting a difference in the electric field due to the presence of the fluid in the vicinity of a plurality of pairs of capacitive plates in comparison to the baseline output signal indicative of the substrate having no fluid coverage. In more particular embodiments, the coverage map is provided to a controller that controls the fluid supply, thereby establishing a feedback loop that directs the fluid supply to apply additional fluid to the substrate until a pre-determined coverage of the substrate is reached. In a similar fashion, the coverage map can be used to causes the system to mix, distribute or remove the fluid as needed for a particular process step.

While any source of current can be used in the sensing electronics of the disclosed system, in particular embodiments the current is an AC current, and the AC current can be scanned over multiple frequencies to aid in detection of the identity of the fluid applied to the substrate. Various electric and physical properties can be detected between capacitive plates in order to detect and/or identify a fluid applied to a substrate, and these electric and physical properties include for example, one or more of voltage, current, capacitance, electric field strength, dielectric constant and impedance.

In another particular embodiment, the sensor area including the array of capacitive plates, includes a plurality of sensors each directed to a respective area of the slide, with each sensor comprising a capacitor structure having spaced conductors between which an electric field is formed when current is applied across the spaced conductors or one of the conductors is charged by current, wherein an electrical field extends through the slide such that the fluid, when present on the slide in the particular area, affects electrical properties of the capacitor structure.

According to another particular embodiment, a disclosed system includes a slide or other sample support having thereon a sample of material for treatment or analysis, the treatment or analysis including application of a fluid to the sample. The system according to this embodiment further has a cradle for receiving the slide, and a fluid supply supported so as to supply the fluid onto the slide. The fluid supply is controlled by control circuitry. A sensor set is included, which sensor set includes a plurality of sensors, each sensor set directed to a respective area of the slide, and each sensor set representing a capacitor structure having spaced conductors between which an electric field is formed when current is supplied to the spaced conductors. The electrical field generated by each sensor set can extend into the slide, into the sample, and even into the fluid, when present on the slide in the area, affects electrical properties of the capacitor structure. In a particular embodiment, the conductors are fabricated as planar square plates, wired into linear row and column arrays, creating a spatially addressable sensing area. In another embodiment, conductors are wired together diagonally, to create a different shape to the spatially-selectable sensing area. In still another embodiment, a single grid is the reference signal for individually addressable sensing sets. In still another embodiment, the plates may be located at different depths within the supporting structure, either with two-dimensional addressing of linear arrays to form a spatially selective sensing signal, or with individual sensing plates referenced to a single backplane.

As in the embodiments above, the sensor set(s) can be in a structure supporting the slide or sample support, contained in the slide or sample support, or may be supported elsewhere in the apparatus, such as above the sample or between the sample and the slide, provided that it is positioned so that it can sense the presence of fluid on the slide. When a sample on a slide is placed in the apparatus, interrogating circuitry in a single polling, or a continuous or periodic polling, supplies an electrical current to the electrodes of each sensor and detects one or more electrical properties of the capacitor formed via the establishment of an electric field through the slide, the sample, and/or the fluid sample (or air if no fluid is present).

According another particular embodiment, the electrical circuitry is configured to derive coverage assessment data for the slide from a respective output signals responsive to the application of an interrogating signal or current to each sensor that is reflective of a respective degree of fluid coverage in the vicinity of the sensor and thereby generate a coverage map. In a further particular embodiment, a control loop controls the fluid supply (or a mechanism that spreads the fluid on the slide or some other mechanism redistributing fluid on the slide, such a vibrating support) is responsive to the coverage map so as to cover the entire slide, or a predetermined desired coverage area thereof, with fluid or to ensure adequate coverage of the sample.

In still further particular embodiments, the electrical circuitry makes a determination of the identity of a fluid based on the electrical changes, wherein the current applied to the sensors includes a plurality of currents each of a distinct respective frequency, and the determination of the identity of the fluid relies on a trained logistic regression algorithm supported by the electrical circuits. The electrical circuitry can also determine a volumetric assessment corresponding to an amount of fluid on the slide based on the coverage assessment and the identification of the fluid. In another embodiment, a system is disclosed that includes a sample support structure supporting a sample thereon for treatment with a fluid.

In another particular embodiment, a system is disclosed wherein the sample support structure is a slide having thereon a sample of material for treatment or analysis, which treatment or analysis involves application of fluid to the sample. In this embodiment, the system further includes a cradle receiving the slide, a fluid supply supported so as to supply the fluid onto the slide; and a mixing or dispersing apparatus that agitates or otherwise spreads or moves the fluid once on the slide (such as an opposable surface, an air knife, a moveable spreading device that forms a capillary gap between the slide and the spreading device, a source of vibrational energy or acoustic energy to cause mixing, or the like). The fluid supply and the mixing or dispersing apparatus are controlled by the control circuitry, for example, in a feedback loop in communication with a fluid coverage map, to ensure fluid is located, placed, removed or otherwise manipulated to ensure that treatment of the sample is conducted according to a pre-determined protocol.

Also disclosed is a method, the method including providing a sample support having a sample (for example, a biological sample, such as a tissue section) thereon to be treated with a reagent fluid, applying the reagent fluid to the sample support and sensing the presence of the reagent fluid on the sample support. The sensing step can include detecting a respective impedance for at least one pair of a plurality of sensor elements positioned such that presence of the reagent fluid in a respective subarea of the sample support alters the impedance of a capacitor formed between the at least one pair of the plurality of the sensor elements. In more particular embodiments, a degree of fluid coverage is determined from said sensing, which in even more particular embodiments is used to control application of the reagent fluid by applying the reagent fluid from a fluid supply mechanism that is in feedback control with the sensing step such that the reagent fluid is dispensed, mixed or otherwise dispersed to achieve a predetermined degree of fluid coverage on the sample support.

In another embodiment, the disclosed method includes providing a sample support (such as a microscope slide) having a sample thereon that is to be treated with a reagent fluid, applying the reagent fluid to the sample support, and sensing presence of the reagent fluid on the slide. According to this embodiment, sensing includes detecting the respective impedance (understood to include those properties that comprise impedance including capacitance, resistance, dielectric strength, and conductivity) for each of a plurality of sensor elements positioned such that presence of the reagent fluid in a respective subarea of the slide alters the impedance of a capacitor formed within the sensor element. In a particular embodiment, the method further includes determining a degree of fluid coverage from the sensing, for example, to provide a coverage map. The method can further include application of the reagent fluid using a fluid supply mechanism operated by electrical circuitry, mixing or dispersing of fluid once on the slide using a mechanism operated by electrical circuitry, and/or controlling the fluid supply, mixing, or dispersion mechanisms using data derived from the detecting of the impedance of the sensor elements so as to cover a predetermined coverage area of the slide with the reagent fluid. In even more particular embodiments, an identification of the reagent fluid is made based on the detecting, detection of bubble formation, and/or detection of reagent fluid evaporation can further be made by the detecting of the impedances.

According to still another embodiment, the disclosed method includes providing a sample support (such as microscope slide) having a sample thereon to be treated with a reagent fluid, applying the reagent fluid to the sample support, and sensing presence of the reagent fluid on the slide. The sensing in this embodiment includes detecting respective impedances for each of a plurality of sensor elements positioned such that presence of the reagent fluid in a respective subarea of the slide alters the impedance of a capacitor formed by the sensor elements. Detecting the impedance may be done by applying an electrical current to one of the plates of the capacitor formed by the plates of a sensor element and receiving a signal at the other of the plates, which may be in the form of an output current from the other plate and from which impedance may be determined by the drop in voltage or the drop in amperage. Also a degree of coverage may be determined from the sensing. The step of applying the reagent can then be performed using a fluid supply mechanism operated by electrical circuitry, and the method can further include controlling the fluid supply mechanism (or other means of affecting coverage) using data derived from the detecting of the impedance of the sensor elements so as to cover a predetermined coverage area of the slide with the reagent fluid. In more particular embodiment, the method further includes detecting bubble formation in the reagent fluid by detecting the impedances.

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary unless a particular order is clearly indicated by the context.

As used herein, the term "about" refers to plus or minus 1-10% of the referenced number, for example plus or minus 1-5% of the referenced number, such as plus or minus 1-2% of the referenced number.

As used herein, the term "substantially" refers to at least 90%, for example at least 95%, such as at least 99% of the referenced object of the term.

As used herein the term "biological sample" refers to a sample obtained from an organism or otherwise derived from an organism's tissues or from fluids present in or expelled from the organism.

Figure 1:
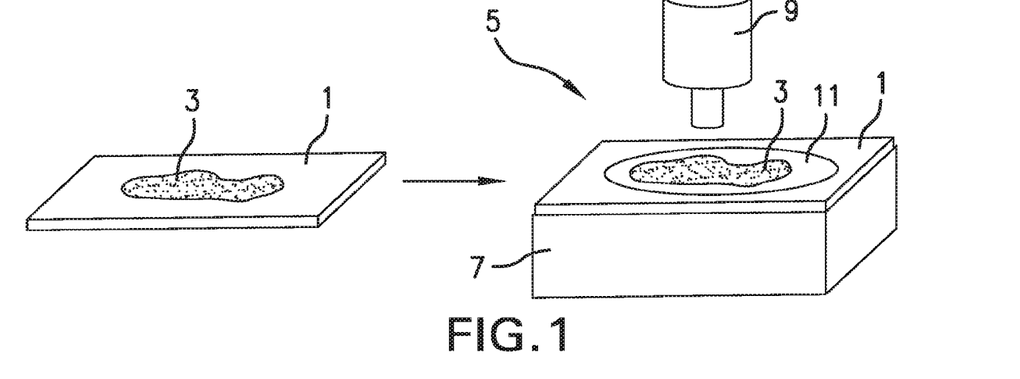
FIG. 1 is perspective diagram of an embodiment of a disclosed slide treatment system.

Referring now to FIG. 1, in the system of one embodiment, a glass microscope slide 1 has applied to it a thin sample 3 of tissue or other material to be analyzed. The slide itself is commonly made of glass, but may also be of a variety of materials and configurations, and with various coatings. The length and breadth of the slide may vary widely, but the most commonly used slide 1 has dimensions of about 1 inch by about 3 inches (or about 25 mm by about 75 mm). The thickness of the glass slides is usually in the range of about 0.9 to about 1.2 mm. Normally, the tissue sample is extremely thin, such as with a thickness in the range of about one micron to about 20 microns. Other types of sample support structures other than slides, such as plates or test-strips or Petri dishes, may be employed according the disclosure.

Apparatus and Holder Structure

The slide 1 is placed or conveyed to an apparatus generally indicated at 5 where it is supported on a holder structure 7. Holder structure 7 has an upper surface on which the slide 1 rests, and may optionally have a cradle or tray structure that holds the slide 1 in place on it. In addition, the holder structure 7 may include temperature controls, such as a heater, to bring the temperature of the slide 1 and the sample 3 to an appropriate temperature for the process to which it is subjected.

A fluid supply mechanism 9 provides fluid to the top of the slide 1 and over the sample 3. This fluid supply mechanism 9 is controlled by electronics, such as a computer or processor of the apparatus 5, so as to control supply of the fluid to cover the slide 1.

Figure 2:
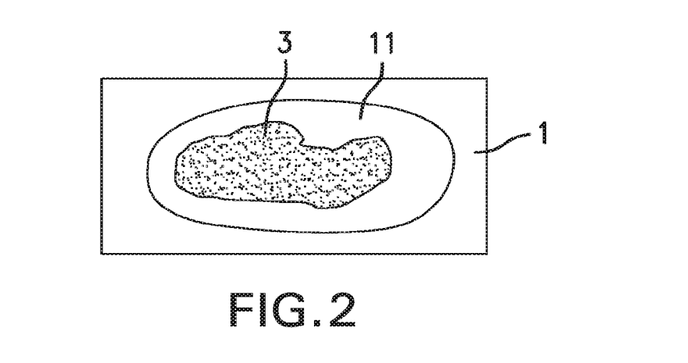
FIG. 2 is a plan view of a slide with an exemplary sample and a partial puddle of fluid spread thereon.

Referring to FIG. 2, in the preferred embodiment shown, as the fluid is applied to the slide 1, it forms a puddle 11. The size of the puddle desired may vary depending on the application. Ordinarily, the puddle should cover the at least the sample, although there may be applications in which only a predetermined coverage area constituting only part of the sample is covered with the given fluid. In other scenarios, it is desirable to cover the entire slide so as to be certain that the entire sample is covered. In those applications, when the puddle 11 does not cover the entire slide, more of the fluid is supplied (or redistributed), and the puddle 11 expands as the fluid is supplied until it covers the entire upper surface of the slide, as will be described herein.

In other embodiments, a different type of fluid supply mechanism 9 may be used to apply two or more different fluids across the sample and the slide in generally parallel stripes, swaths or lanes, wherein each fluid has a respective desired coverage area. The process herein may also be used with such a fluid-supply system advantageously to ensure proper application of the various fluids to the slide.

Figure 3:
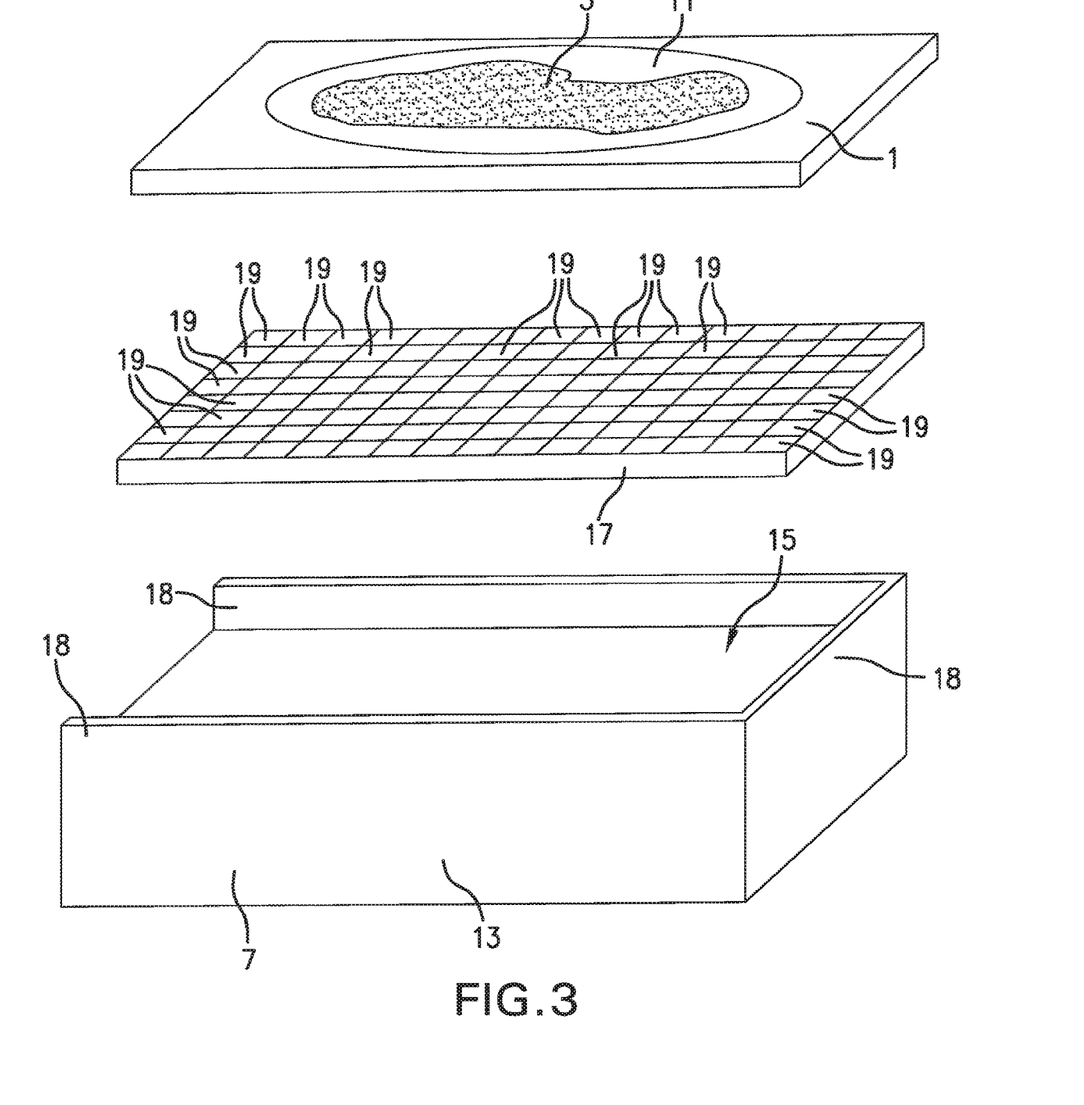
FIG. 3 is an exploded perspective view of a slide treatment system according to the disclosure including a capacitive sensor array for detecting the nature and distribution of a liquid on a substrate.

Referring to FIG. 3, the holder 7 has a base structure 13 with an upper receiving area 15 onto which a sensor array plate 17 is mounted, from which mounted position the plate 17 is electrically connected to the electronics of the apparatus (not shown).

Sensor Array

Figure 4:
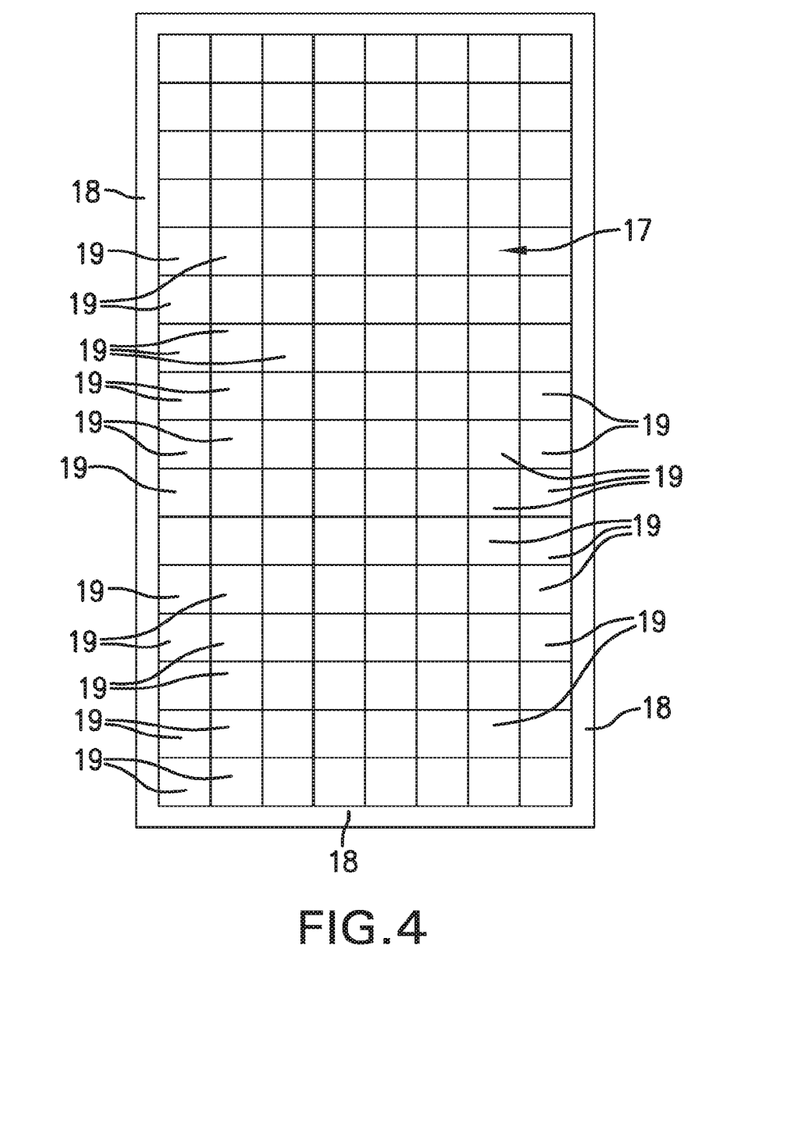
FIG. 4 is a detailed vertical cross-sectional view through a transparent slide and to particular embodiment of an array of capacitive plates below.

Referring to FIG. 4, sensor array plate 17 has a matrix of generally planar capacitance pads or plates 19 with upwardly facing surfaces. In the preferred embodiment, the plates 19 are each approximately 3 mm×3 mm square, but differently sized plates may be used, for example, that are from about 2 mm to about 4 mm square, and in different shapes, such as rectangular shapes. Furthermore, the spacing between the plates can be varied to provide differing levels of detection within the substrate an into a fluid placed thereon, for example, from about 0.05 mm to about 0.2 mm, for example, about 0.1 mm. In addition, the sensor matrix of the preferred embodiment shown is 8 rows of 16 plates each, but the number of rows and columns may be varied, and the configuration of the arrangement may be something other than a rectangular matrix as well.

Figure 6:
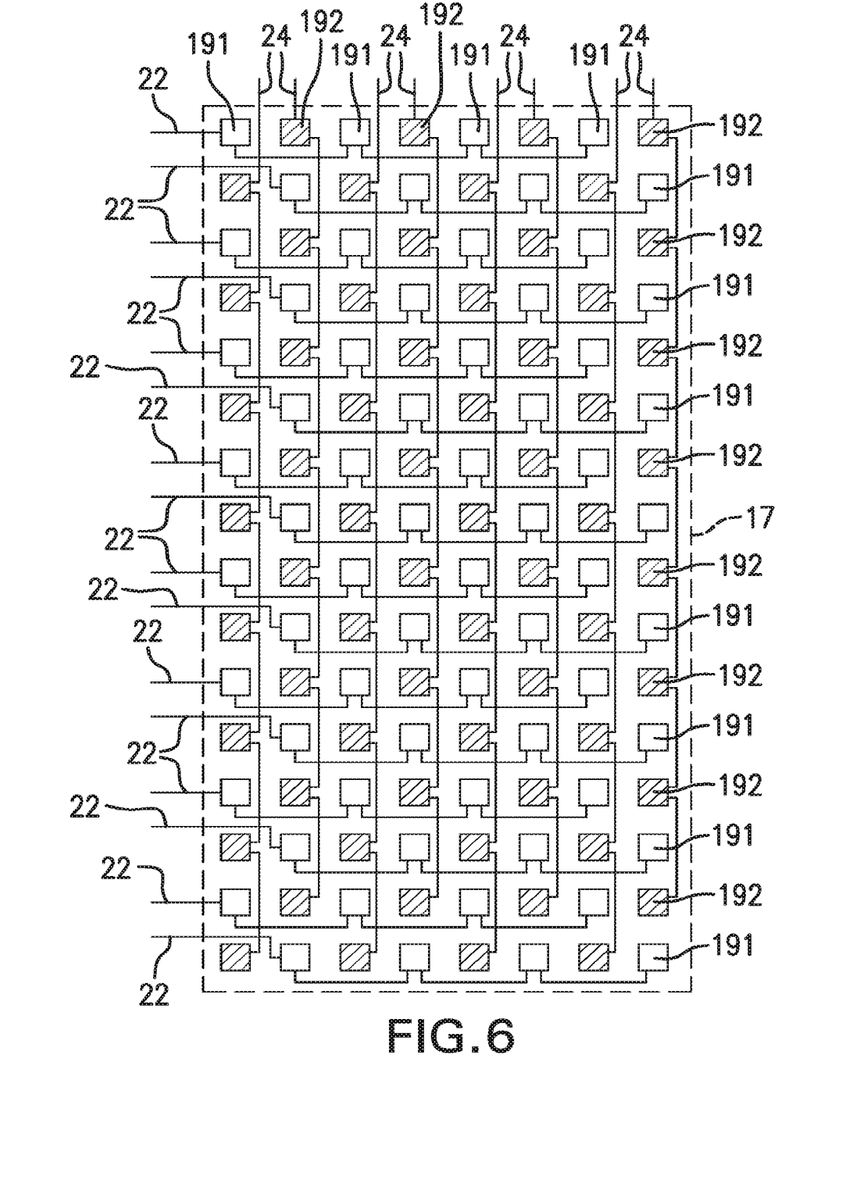
FIG. 6 is a schematic diagram of an embodiment of an exemplary capacitive sensor array according to the disclosure.

The plates are adjacent to, but electrically separate from, each other, except for the wiring between the plates shown in FIG. 6. The sensor plate 17 fits into or is mounted on the base 3, and electrical connections or contacts connect the plates 19 of the sensor plate 17 to electrical circuitry in the base 3 that allows the electronics of the apparatus to access the sensors plate 17 for determining the presence of liquid or other material on the slide. The sensor plate 17 may fit into an upper recess, such as the recess shown in FIGS. 3 and 4 between vertical walls 18, which define a sort of cradle that holds the sensor plate 17 in place. Walls 18 may extend above the sensor plate 17 to hold the slide 1 thereon in place so as to predictably align and position the slide 1 with respect to the sensor plate 17. It will be understood that a variety of structural arrangements can be employed to accomplish the alignment of the slide and the sensor plate 17.

When the slide 1 rests on the sensor plate 17, the sensor plate 17 can be employed to detect the fluid applied to the slide by the fluid supply mechanism 9 of FIG. 1.

Optionally, a protective layer or thin plate of material may be used overlying the plates 19, provided that the protective layer does not prevent the sensing of fluid on the slide.

Sensor Operation

Figure 5:
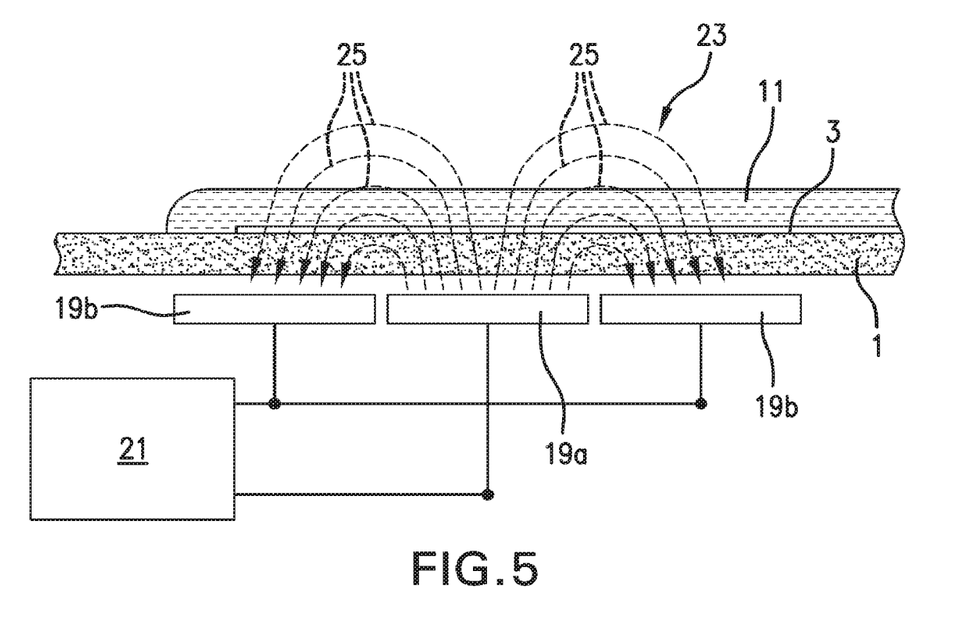
FIG. 5 is a plan view of a substrate holder of a disclosed substrate treatment system showing and embodiment of a capacitive sensor array below and how electric fields extend from the capacitive array into and through the substrate to a biological sample and liquid above.

The sensor plate 17 operates similarly to a capacitive touch screen on a cell phone, as is illustrated in the detail diagram of FIG. 5.

Sensing electronics 21 are connected with the sensor plate 17, and selectively supplies electrical power to the plates 19 to scan the capacitive properties of each plate 19. To scan a given plate 19a, the sensing electronics 21 periodically connect two poles of a current, preferably an AC current at a voltage of from 1 to 10 volts, to plate 19a and one or more adjacent plates 19b. When so connected, plate 19a and the adjacent plates 19b act as a capacitor, forming an electrical field 23 between the plates 19a and 19b.

As the fluid is applied to the slide 1, the puddle 11 eventually extends into the effective area of the electrical field of capacitor plate 19a in the sensor plate 17. The electrical field is illustrated by phantom lines 25, and it extends from one plate 19a, through the slide 1, and through the sample 3 and the puddle 11 when they are on the slide 1 in an area near the plate 19a, and then to the other plates 19b, completing the capacitor circuit.

There may be a layer of dielectric material over the matrix of plates, but also both the puddle 11 and the sample 3 have dielectric properties to some degree. The puddle fluid may be aqueous, although for some tissue analysis it may be organic or other types of fluid, and the material of the sample 3, while very thin, may be any sort of organic tissue or material. As a result, the presence of the puddle 11, and to some lesser degree the sample 3, alters the impedance between the plates 19a and 19b, and alters properties of the output signal produced responsive to the electric field established through the puddle by application of the input current or signal.

The sensing electronics 21 detect electrical properties of the electric field established across the capacitor 19a/19b and transmit data indicative of those properties or some comparative data derived from those detected values to the other circuitry of the apparatus, as will be described below. A comparison of the properties of the output signal when the plates 19a and 19b are connected to the current source as compared to a baseline impedance of the slide 1 alone with only air over it, and no sample or fluid present allows a determination of the impedance created by the puddle and/or the sample, from which a number of conclusions may be drawn, as will be described below.

It will be understood that a system according to the invention may employ one or more of a variety of designs to determine the impedance or capacitance or a related property of the sensors other than simply passing a current through the respective plates.

Sensor Plate

FIG. 6 shows a schematic of the electrical connections between the plates 19 in the sensor plate 17 and leads that are connected with the supporting electrical circuitry 21.

According to the one embodiment, all of the plates 19 are coplanar and organized in eight columns and sixteen rows. Each of the sixteen rows has a respective driving line 22 associated with it, and each column has a respective sensing line 24 associated with it. The driving lines 22 and the sensing lines 24 are connected with the sensing electronics 21 (FIGS. 5 and 7), which selectively applies input current to establish an electric field with respect to each of the plates 19 in a spatial encoding scheme.

As seen in FIG. 6, the internal connections of the plates 19 in the array are that the plates 191 (the white squares) in each row are connected in series to a respective driving line 22, and alternate with plates 192 (the shaded squares) of the columns. Plates 192 of each column are connected in series to a respective sensing line 24. With these connections, it is possible to poll each plate 19 by feeding an input current and detecting the output signal between the lines 22 and 24 of the row and column of that particular plate.

System Operation

Figure 7:
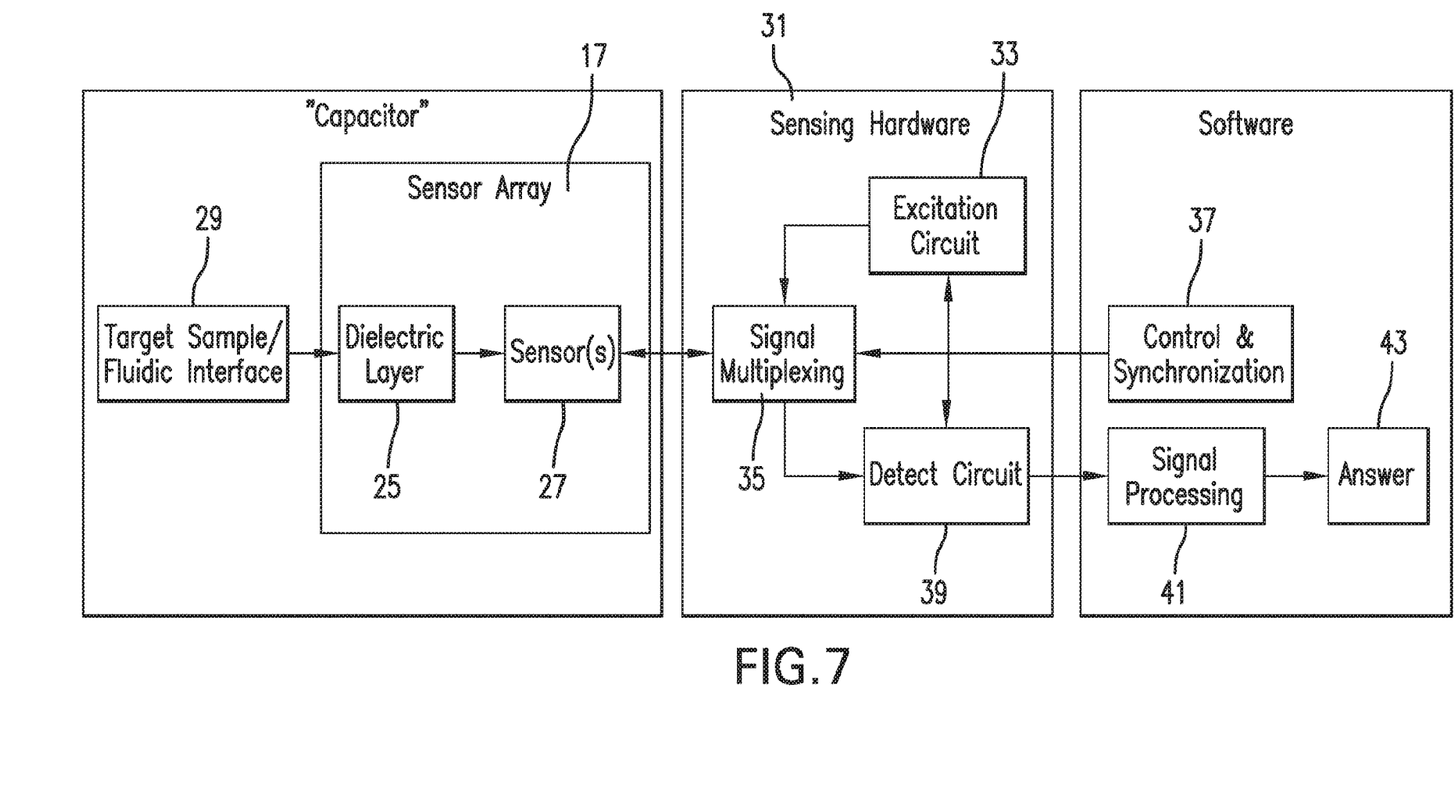
FIG. 7 is a schematic diagram of the components of a system according to a disclosed embodiment.

Referring to FIG. 7, the circuitry and functionality of the apparatus using the sensor plate 17 are illustrated.

The sensor array 17 comprises a dielectric layer 25 and the specific sensors 27 of the array which generally refer to each respective plate 19. The sensor array 17, together with the target sample fluid interface 29 which generally comprises the slide 1, the sample 3 and the puddle 11, together form a set of capacitors, as described above.

The apparatus according to one embodiment is a computerized system that includes one or more microprocessors and electronic data storage connected with the microprocessors. The electronic data storage stores data that constitutes software instructions executed by the microprocessor or microprocessors so as to control operation of the apparatus, as is well known and common in the art.

The individual plates 19 of the sensor array 17 are accessed by sensing hardware 31, which corresponds to the electronics 21 in FIG. 5. The sensing hardware 31 includes an excitation circuit 33 that produces current, preferably AC current with a voltage in the range of 1 to 10 or more volts. The current produced in some embodiments includes one or more AC currents, each with a respective pre-determined alternating-current frequency, for identification of the fluid on the slide, as will be discussed below.

The excitation circuit 33 supplies the current to signal multiplexing component 35, which is essentially a switching component controlled by a control and synchronization component 37. The control component 37 is controlled by the computerized apparatus, preferably by a microprocessor in the apparatus operating according to stored control software data stored in computer accessible memory. Signal multiplexing component 35 controls switches so that it communicates the current from the excitation circuit 33 in series to each of the various sensors 27 of the sensor array 17, which are all polled each polling cycle. The polling takes place periodically and continually, with a duty cycle appropriate to the operation of the apparatus, e.g., every 1 to 20 seconds.

In the system and method shown, the 128 individual plates or sensors of the sensor array 17 are each individually polled in each polling cycle by control component 37 causing the signal multiplexing component 35 to connect the AC current to the relevant lines 22 or 24 for each given plate 19, and to measure the output signal from the relevant line 22 or 24 on the other side of the capacitor structure created when each plate 19 is polled.

The signal multiplexing component 35 receives the output signal from the individual sensors 27 being polled, and supplies this signal to a sensor detect circuit 39. The sensor detect circuit 39 receives the output current from signal multiplexing component 35 and also a reference input signal from excitation circuit 33 so as to compare these two and make determinations of the relative electrical properties, which may include, for example, amplitude or amperage, voltage, and phase shift of the A/C signal that are imparted by the given capacitor.

The main apparatus processor system is indicated at 40. The data from the detect circuit 39 of the sensing hardware 31 is transmitted to a signal processing component 41 operated by the processor executing software stored so as to be accessible electronically thereto. The processor stores at least some data from earlier readings, and uses the stored data as well as the present polling data regarding the sensor array to determine the coverage of the slide by the fluid, and possibly to determine the type of fluid applied to the slide and to determine the volume of fluid on the slide.

The signal processing process step involves processing the data of the polling of the sensors to derive information about the slide and the fluid or the sample thereon, which may be one or more of a variety of sorts of information, such as, e.g., coverage of the slide by fluid, as will be discussed below. Whatever the information derived may be, the result of the signal processing is provided as answer or output 43.

Figure 8:
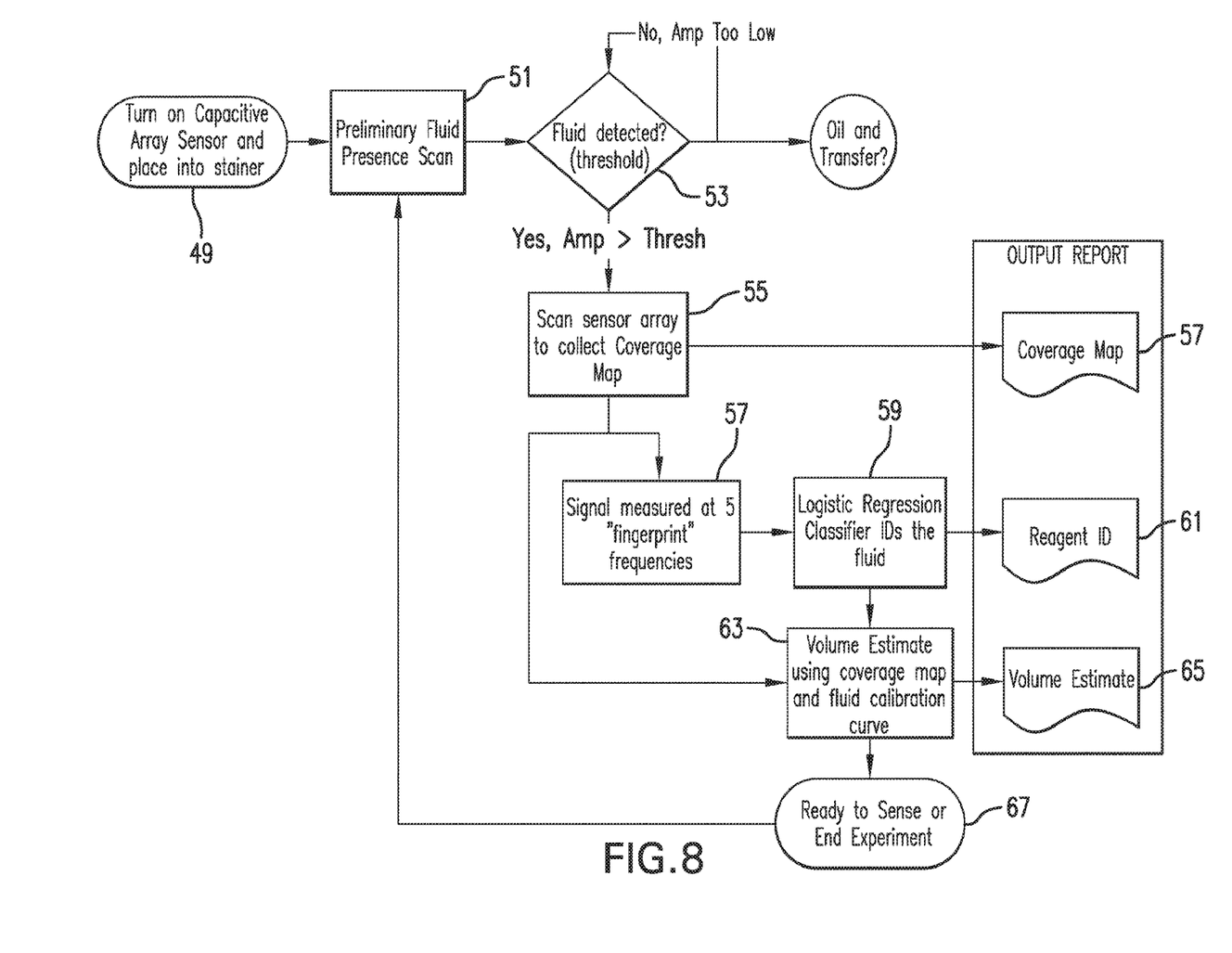
FIG. 8 is a flow chart illustrating an exemplary logic operation for a computerized control system for substrate treatment according to the disclosure.

The processor or internal computer of the apparatus 5 executes stored software that causes it to function according to the method shown in the flowchart of FIG. 8.

Initially, to start the process, the system is turned on and the sensor plate or array is positioned in the apparatus 5 or stainer in step 49 and the slide is placed on it. An initial poll of the sensor array with the slide and sample, but no fluid applied yet, is performed in step 51. Alternatively, an initial poll can be performed at a frequency that creates an electric field that measures only electrical properties of the slide. The capacitor plates 19 each have a respective output current that is analyzed for an electrical property that is indicative of the change in impedance due to the application of fluid to the slide in the area of that particular plate 19. This yields data that serves as a baseline value for each plate of the sensor array. In the preferred embodiment, the electrical property used to determine coverage of the slide in the area of a given plate is the voltage drop with respect to an adjacent plate 17 when a drive current is supplied to the plates 17.

At decision 53, the sensor plate is polled to derive a current sensor value for each plate 19 derived from one or more detected electrical properties of the input and output signals across each sensor plate 19, such as, e.g., the output voltage or the ratio of output to input voltage. This current sensor data for each plate is compared at decision 53 with the baseline threshold level of the given plate as determined in step 51. If the current sensor data indicates that the level of impedance for the plate 17 has remained constant, i.e., there has been not enough fluid added to the slide to cause a change in impedance, then decision 53 loops to the next duty cycle, and it keeps on looping and polling the sensor array until the currently polled sensor array data indicates that the fluid is present on some of the plates 18. This indicates that the puddle 11 is beginning to be formed on the slide 1.

Coverage Map

Once the puddle 11 begins to be formed, the system scans the sensor or array 17 and identifies those plates 19 of the sensor array 17 that, based on a comparison of their current sensor data to the baseline data, have fluid partly or completely overlying them.

The specific differences between the output and input signals applied to the individual capacitors 19 of the sensor array 17 are usually a constant value until the fluid is applied to the slide. When the fluid is initially applied to the slide, if there is only partial coverage of a given area of a plate, there is only a slight increase in the output signal compared to the input signal due to a fractional change of the effective dielectric strength of the medium between the plates. For the determination of coverage to be complete, this output signal value should exceed some pre-determined threshold level to ensure that the area of the plate 19 is entirely covered by the fluid, and also to ensure that there are no bubbles or other interruptions in the full application of the puddle 11 to the slide and sample, such as where an oil drop is trapped below an aqueous puddle, which would result in an unusually low output signal due to the non-polar nature of the oil in the drop.

For the preparation of the coverage map, the processor and associated electrical circuitry continually and repeatedly check the impedance or other relevant electrical property of each of the pads 19 on the sensor matrix 17. The resulting electrical data for each plate 19 is recorded and stored in a respective element of an array of electronically accessible stored data values stored in the system. When there is a change in the impedance for any particular pad or plate 19 that exceeds a pre-determined threshold difference or ratio with respect to the previous impedance value, the value of the corresponding element in the array of data values or flags has the value for that particular plate 19 set to a value that indicates that it is covered with the puddle. This array of coverage map values is modified in real time as the values of the impedances of each of the plates 19 changes. Each element of the coverage map array and corresponding display may be a simple data flag or indication that the respective area is covered with fluid. Alternatively, the elements of the array may be data values indicative of the degree of coverage over a range from no fluid present to totally coverage with fluid.

The values of this array are used by the control system to determine whether to direct the fluid supply mechanism 9 to supply more fluid to the slide, to discontinue fluid supply, or to mix or disperse the fluid further on the slide with a distributing device in the system until all of the elements of the array indicate that the slide is completely covered, or when a set of the elements of the array corresponding to a desired predetermined coverage area, e.g., the shape of the sample, indicate that the area is covered with fluid, and that there are no bubbles. The data of the array of sensor readings is used to prepare a coverage map, which is output in step 57 so it can, for example, be viewed by a technician as the puddle changes.

The results of the coverage map scanning 55 may be also used in a software-implemented control loop to automatically control the fluid supply mechanism that supplies the fluid forming the puddle 11 on the slide, so that fluid continues to be supplied until the predetermined desired coverage area or the entire slide is completely covered. This allows efficient application of the fluid to the entire slide by a completely automatic process.

Fluid Identification

In addition to purely sensing the presence of the puddle on the surface of the slide, it has been discovered that different types of fluids used in testing or staining a sample have different dielectric coefficients or properties that make it possible for the sensor array 17 to identify the specific fluid or fluids that are present in the puddle based on the dielectric or impedance properties that the fluid exhibits responsive to alternating currents with varying frequencies. During the loading of fluid onto the slide 1 or afterwards, the sensor array 17 may therefore be used to determine the specific fluid components in the fluid on the slide to classify what exactly is being applied to the slide. This is accomplished in the preferred embodiment by polling the plates 19 and measuring the impedance or other related electrical property of the individual capacitor plates 19 responsive to AC current with a voltage of 1 to 10 volts at a set of, e.g., five, discrete fingerprint frequencies which are developed for the given fluids to be applied.

The measurement at different frequencies allows the system to discriminate between different types of fluids that are applied whether alone or mixed together with other fluids. This measurement is made at step 57. A logistic regression is applied to classify the identification of the fluid in step 59 and an output report indicating the identification of the reagent is made at step 61.

Generally, aqueous fluids provide for a greater passage of voltage through the capacitor plate 19 due to the polarity of the solution and its ability to conduct electricity to some degree. In contrast, oils and other organic solvents or reagents tend to have higher impedances, due to a greater resistance to conduction of the electrical current through them. In addition, different solutions have different levels of dielectric dependent on the different frequencies being applied. The frequencies of the AC current applied generally start at about 12 KHz, and increase from that level. For example, a set of frequencies of 16.3 kHz, 22.3 kHz, 1.02 MHz, 2.59 MHz and 3.95 MHz may be advantageously employed in the system.

Figure 10:
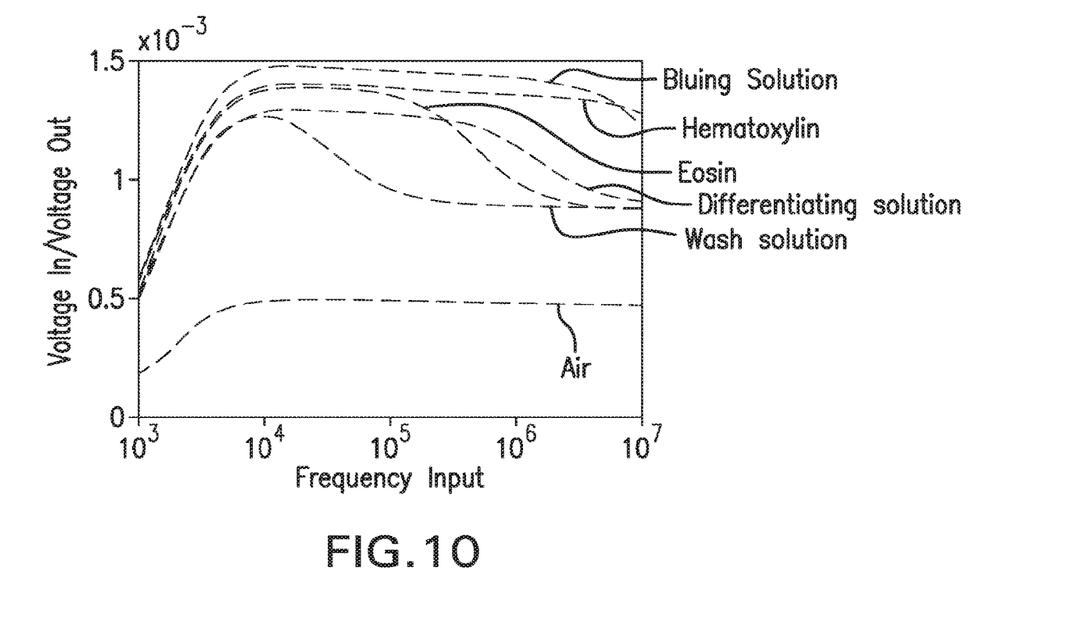
FIG. 10 is a graph showing voltage changes as a function of AC frequency for various types of fluids.

Referring to FIG. 10, it may be seen that over a range of frequency inputs from one to ten thousand kilohertz or kHz, the effect of different fluid compositions on the input to output voltage ratio is a variable and to a degree distinctive for each of the exemplary fluids, i.e., bluing solution, hematoxylin solution, eosin, a differentiating solution, a wash solution and air. The ratio of voltage in to voltage out starts at approximately 0.5 and increases up until approximately 10 kHz, whereupon a plateau is reached at different levels for the different compositions of fluid, and then, subsequently, the impedance of the given fluids results in the differing levels of output voltage over a range of frequencies.

Specific fluids may be identified by checking their varying impedance or dielectric qualities at five different distinct frequencies starting at approximately 12 kHz. A neural net using these frequency values and inputs in voltage and voltage out ratios is used to train a system to develop a fairly high reliability in terms of identifying the specific fluid composition that is applied to the slide.

One use for this determination is to determine if the wrong fluid is used, and to alert a human user of the apparatus responsive to such a determination.

Volume Estimation

Returning to FIG. 8, once the coverage map has been completed, it is possible for the software to further calculate a volume estimate in step 63. Volume is determined for the amount of fluid that is present on the slide by projecting the volume based on the data indicative of the area of the slide and the coverage of the slide, i.e., complete coverage or a lesser amount, combined with the defined fluid composition data. From this data, the thickness of the puddle and its general dimensions can be determined, from which an estimate of the volume of fluid present can be calculated.

This volume estimate data value is output at 65 to indicate the volume of fluid that has been applied to slide 1.

Once these determinations and/or outputs have been made, a determination is made whether to proceed with the analysis or to end the experiment at step 67, returning the control to the original initial setup, step 51, where a new slide with a new sample is loaded into the apparatus and a baseline threshold impedance for the slide with only the sample is detected.

Figure 9:
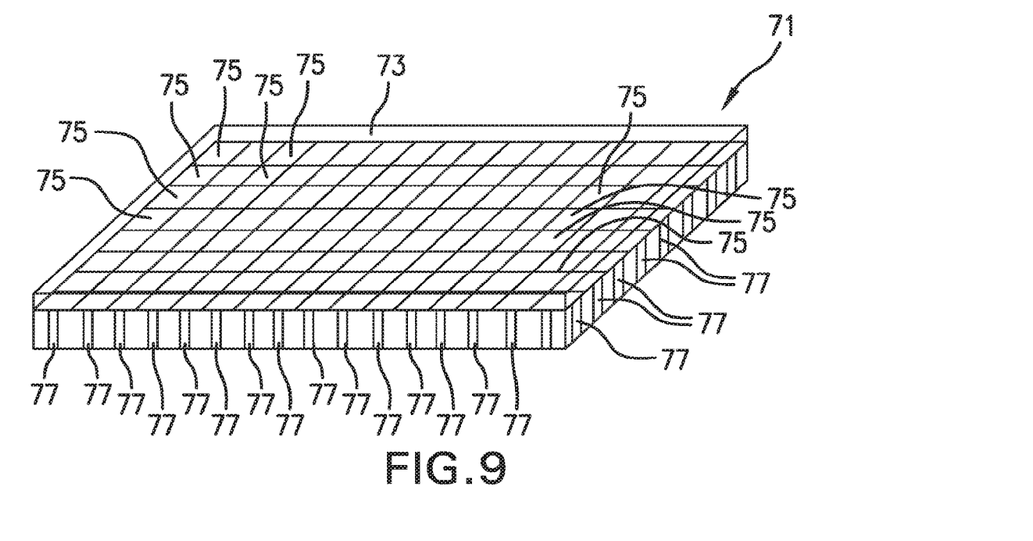
FIG. 9 is a perspective view schematic diagram of an alternative embodiment in which the capacitive sensor array is in the substrate itself, rather than the holder.

Referring now to FIG. 9, in an alternate embodiment, a slide 71 is itself provided with an embedded sensor array. The slide 71 of this embodiment has a top plate or film 73 that overlies a sensor array of plates 75, which are electrically connected as for the plates 19 of the previous embodiment. The slide 71 has a row of contacts 77 on one long edge and one short edge of the slide, which provide for contact of the internal lines, similar to lines 22 and 24 of the previous embodiment, connecting the plates 75 with the electronic interrogation circuitry of the sensing hardware, so that when the slide is inserted into the tray in a base structure 3 in the apparatus 5, the electrical contacts are made, and operation of the coverage of the slide and its sample with the fluid puddle overlying all of the sensors is possible.

The terms herein should be read as terms of description rather than of limitation, as those with this disclosure before them will be able to make changes and modifications without departing from the spirit and scope of the disclosure.

The invention claimed is:

1. A method for identifying a liquid dispensed to a surface of a substrate, comprising: (a) positioning a sensor array in the vicinity of the substrate, the sensor array comprising an array of capacitive plates; (b) measuring an electrical property of at least one capacitive plate of the array of capacitive plates responsive to alternating currents at one or more of a plurality of different frequencies; (c) identifying the liquid dispensed on the surface of the substrate based on the measured electrical property at the one or more of the plurality of different frequencies, wherein the identifying of the liquid dispensed to the surface of the substrate is based on one of a logistic regression or a trained neural network, wherein the array of capacitive plates are arranged in a grid-like array, wherein each row of the grid-like array comprises a set of serially connected capacitive plates electrically coupled to a driving line, and wherein each column of the grid-like array comprises a set of serially connected capacitive plates electrically coupled to a sensing line.

2. The method of claim 1, wherein the identifying of the liquid dispensed to the surface of the substrate is based on a logistic regression.

3. The method of claim 1, wherein the identifying of the liquid dispensed to the surface of the substrate is based on a trained neural network.

4. The method of claim 1, wherein the measuring comprises determining the impedance of the at least one capacitive plate responsive to AC current with a voltage of about 1 to about 10 volts at each of the plurality of different frequencies.

5. The method of claim 1, wherein the plurality of different frequencies range from about one thousand kilohertz to about ten thousand kilohertz.

6. The method of claim 1, wherein the array of capacitive plates is integrated into the substrate.

7. The method of claim 1, wherein the electrical property measured comprises one of a voltage, a current, a capacitance, and an impedance.

8. A method for identifying a liquid dispensed to a surface of a substrate, comprising: (a) positioning a sensor array in the vicinity of the substrate, the sensor comprising an array of capacitive plates arranged in a grid-like array, wherein each row of the grid-like array comprises a set of serially connected capacitive plates electrically coupled to a driving line, and wherein each column of the grid-like array comprises a set of serially connected capacitive plates electrically coupled to a sensing line; (b) measuring an electrical property of at least one capacitive plate of the array of capacitive plates responsive to alternating currents at one or more of a plurality of different frequencies; (c) identifying the liquid dispensed on the surface of the substrate based on the measured electrical property at the one or more of the plurality of different frequencies.

9. The method of claim 8, wherein the electrical property measured is one or more of a voltage, a current, a capacitance, and an impedance.

10. A method for distinguishing between an aqueous liquid and one of an oil, an organic solvent, or a reagent dispensed to a surface of a substrate, comprising: (a) positioning a sensor array in the vicinity of the substrate, the sensor array comprising an array of capacitive plates; (b) measuring an electrical property of at least one capacitive plate of the array of capacitive plates responsive to alternating currents at one or more of a plurality of different frequencies; (c) distinguishing the aqueous liquid from the one of the oil, organic solvent, or the reagent dispensed on the surface of the substrate based on the measured electrical property at the one or more of the plurality of different frequencies.

11. The method of claim 10, wherein the electrical property measured comprises one of a voltage, a current, a capacitance, and an impedance.

12. The method of claim 10, wherein the array of capacitive plates are arranged in a grid-like array.

13. The method of claim 10, wherein the measuring comprises determining the impedance of the at least one capacitor plate responsive to AC current with a voltage of 1 to 10 volts at each of the plurality of different frequencies.

* * * * *